(12) United States Patent
Doshi (10) Patent No.: US 10,027,989 B2
(45) Date of Patent: Jul. 17, 2018

(54) METHOD AND APPARATUS FOR PARALLEL DECODING

(71) Applicant: Integrated Device Technology, Inc., San Jose, CA (US)

(72) Inventor: Sandeep Doshi, Sunnyvale, CA (US)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 152 days.

(21) Appl. No.: 14/705,658

(22) Filed: May 6, 2015

(65) Prior Publication Data

US 2016/0330460 A1    Nov. 10, 2016

(51) Int. Cl.
*H04N 19/436* (2014.01)
*H04N 19/91* (2014.01)
*H04N 19/40* (2014.01)
*H04N 19/44* (2014.01)

(52) U.S. Cl.
CPC ............ *H04N 19/91* (2014.11); *H04N 19/40* (2014.11); *H04N 19/436* (2014.11); *H04N 19/44* (2014.11)

(58) Field of Classification Search
CPC ...... H04N 19/91; H04N 19/40; H04N 19/436; H04N 19/44
See application file for complete search history.

(56) References Cited

U.S. PATENT DOCUMENTS

| | | | | |
|---|---|---|---|---|
| 8,635,357 B2* | 1/2014 | Ebersviller | ............ | H04N 19/46 709/224 |
| 8,928,804 B2* | 1/2015 | MacInnis | ............. | H04N 19/124 348/400.1 |
| 8,982,964 B2* | 3/2015 | Tanaka | .................... | H04N 19/50 375/240.12 |
| 9,288,510 B1* | 3/2016 | Yang | ................. | H04N 21/23430 |
| 9,338,467 B1* | 5/2016 | Gadepalli | ............ | H04N 19/127 |
| 2012/0033730 A1* | 2/2012 | Lee | ........................ | H04L 65/607 375/240.12 |
| 2013/0003830 A1* | 1/2013 | Misra | .................... | H04N 19/159 375/240.12 |
| 2014/0086305 A1* | 3/2014 | Esenlik | .............. | H04N 13/0055 375/240.02 |
| 2014/0334557 A1* | 11/2014 | Schierl | .................... | H04N 19/91 375/240.27 |
| 2015/0023409 A1* | 1/2015 | Schierl | ................... | H04N 19/70 375/240.02 |
| 2015/0146794 A1* | 5/2015 | Hoang | .................... | H04N 19/96 375/240.24 |

(Continued)

*Primary Examiner* — Christopher Findley
(74) *Attorney, Agent, or Firm* — Christopher P. Maiorana, PC (57) ABSTRACT

Example methods and apparatuses including a picture parallel decoder are described herein. The picture parallel decoder includes an entropy pre-processing unit, an entropy transcoding unit, and a plurality of decoders. The entropy pre-processing unit may be configured to determine dependencies between frames of an encoded bitstream and to determine slice location data within the encoded bitstream based on dependencies between the frames. The entropy transcoding unit may be configured to transcode slices of the encoded bitstream based on the dependencies between frames. The plurality of decoders may be configured to decode two or more of the transcoded slices in parallel.

20 Claims, 6 Drawing Sheets

(56) References Cited

U.S. PATENT DOCUMENTS

| | | | | |
|---|---|---|---|---|
| 2015/0229945 A1* | 8/2015 | Nakagami | ............ | H04N 19/137 375/240.16 |
| 2016/0088305 A1* | 3/2016 | Oh | ......................... | H04N 19/30 375/240.02 |

* cited by examiner

METHOD AND APPARATUS FOR PARALLEL DECODING

TECHNICAL FIELD

Embodiments described herein relate to video decoding; examples of a parallel decoding scheme for parallel decoding of serialized or sequential linearly encoded bitstreams are described.

BACKGROUND

As the resolution and screen sizes of displays increase and the frame rates of encoded bitstreams become higher, video decoders are increasingly required to support both more processing cycles and processing at faster speeds in order to meet real time decoding requirements for incoming linearly encoded bitstreams. One approach to meeting these real time decoding requirements is to increase processing speed by using faster processing units. This approach is limited by current processor designs, which may not be fast enough to effectively handle processing the decoding of incoming bitstreams, and may additionally require handling large power dissipation. As the rates of linearly encoded bitstreams approach 240 Mbps, relying solely on increasing processing speed may not be practical or sustainable. For example, it may not be possible for the linear scale of decoder processing cycles to meet the real time decoding requirements for larger resolutions such as a 4K×2K 120P decode, which may have a Luma sample rate of more than 1 billion samples per second and require over 2 GHz of processing capacity.

Encoded bitstreams such as high efficiency video coding (HEVC) and H.264 utilizing compressed context-adaptive binary arithmetic coding (CABAC) may be encoded in such a way that a macroblock (MB) or a coding tree unit (CTU) is dependent on a respective previous neighboring MB or CTU. The feedback loop employed during HEVC and H.264 entropy decoding decisions may make decoding tasks unbreakable and not parallelizable using conventional decoding techniques.

DETAILED DESCRIPTION

Certain details are set forth below to provide a sufficient understanding of embodiments of the disclosure. However, it will be clear to one having skill in the art that embodiments of the disclosure may be practiced without these particular details, or with additional or different details. Moreover, the particular embodiments described herein are provided by way of example and should not be used to limit the scope of the disclosure to these particular embodiments. In other instances, well-known video components, encoder or decoder components, circuits, control signals, timing protocols, and software operations have not been shown in detail in order to avoid unnecessarily obscuring the disclosure.

There may be potential complexities associated with the conventional linear decoding setup described above. One potential complexity is that a linear decoding scheme may lack the capacity to handle a bitstream that needs to be decoded real time or faster than real time. The decoder may be limited by its processing speed and may be overwhelmed by the sheer amount of data in the bitstream to be processed. Furthermore, dependencies between frames and pixels in the linearly encoded bitstreams may complicate the ability to decode the linearly encoded bitstream in parallel.

Figures 1, 2A, 2B:
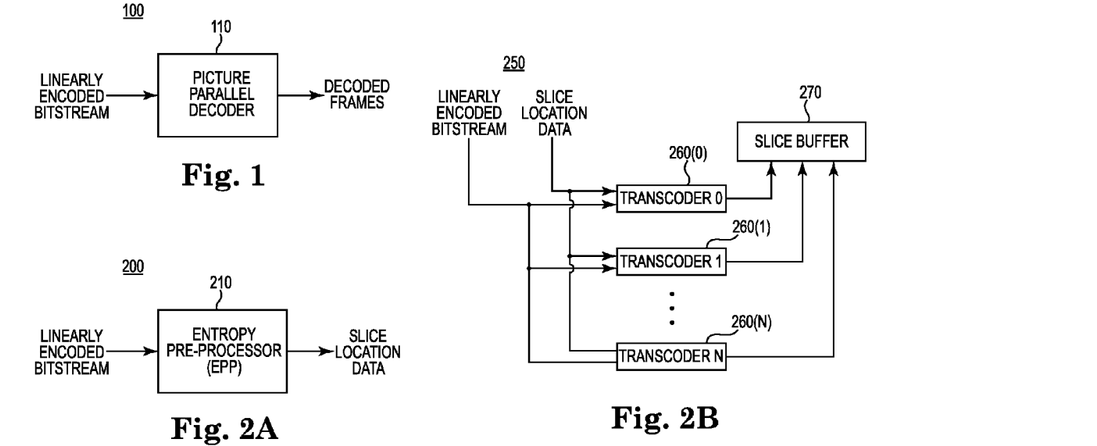
FIG. 1 is a block diagram of a decoding system including a picture parallel decoder according to an embodiment of the disclosure.
FIG. 2A is a block diagram of an entropy pre-processing system including entropy pre-processor according to an embodiment of the disclosure.
FIG. 2B is a block diagram of an entropy transcoder system according to an embodiment of the disclosure.

FIG. 1 is a block diagram of a decoding system 100 including a picture parallel decoder 110 according to an embodiment of the disclosure. The decoding system 100 may be implemented in hardware, software, firmware, or combinations thereof, and may include control logic, logic gates, processors, memory, and/or any combination or sub-combination of the same, and may be configured to decode one or more encoded bitstreams using one or more decoding techniques, and to output decoded frames.

The picture parallel decoder 110 may include one or more processors, one or more transcoders, and multiple decoders. The one or more processors may determine pre-processed location data of the one or more linearly encoded bitstreams using entropy pre-processing. The one or more transcoders may perform memory-to-memory operations on the one or more linearly encoded bitstreams based on the pre-processed location data. The multiple decoders may decode the one or more linearly encoded bitstreams in parallel.

The one or more linearly encoded bitstreams may be comprised of coding units. Examples of coding units include, but are not limited to, frames, sub-frames, regions, slices, coding tree units (CTUs) and macroblocks (MBs). In the interest of clarity, operation of the picture parallel decoder 110 will discussed in terms of frames, slices, segments, and coding units, although in other examples other coding unit terminology may be used. A linearly encoded bitstream of the one or more linearly encoded bitstreams may include video coding layer network abstraction layer (VCL NAL) data and/or non-video coding layer network abstraction layer (NVCL) data. VCL NAL data may include data representing the value of samples in the frames of the encoded bitstream including video parameter set (VPS) raw byte sequence payload (RBSP) data, sequence parameter set (SPS) RBSP data, picture parameter set (PPS) RBSP data, or combinations thereof. NVCL data may include network abstraction layer (NAL) data related to the various parameter set data, slice or frame boundaries, or combinations thereof.

In operation, the picture parallel decoder 110 may receive one or more linearly encoded bitstreams from a stream buffer of a memory. The linearly encoded bitstreams may be encoded using CABAC or some other linear encoding method. The one or more processors of the picture parallel decoder 110 may determine pre-processed location data of the one or more linearly encoded bitstreams using entropy pre-processing. The one or more processors may determine the preprocessed location data based on VCL NAL data and/or NVCL data. The picture parallel decoder 110 may analyze VCL NAL and NVCL data separately in order to efficiently parallelize the linearly encoded bitstream. The pre-processed location data may include slice locations from the VCL NAL data, which may be used to determine encoding dependencies. In some embodiments, slices dependent on a particular slice may be grouped together as a segment, and this segment may be treated as a single slice during pre-processing.

Based on the pre-processed location data, the one or more transcoders may store, at the memory (e.g., a buffer), slice locations of slices stored in the stream buffer. Further, for a respective slice, the one or more transcoders may further store, in the memory, offset locations within the stream buffer of the VPS RBSP data, the SPS RBSP data, the PPS RBSP data, or combinations thereof.

Based on the stored slice location data that identifies a slice or a group of dependent slices within the VCL NAL data, the multiple decoders may decode the one or more linearly encoded bitstreams in parallel. Identifying and storing locations of slice data offsets within the stream buffer may allow parsing of groups of dependent slices to different decoders to facilitate decoding two or more of the groups of slices in parallel.

FIG. 2A is a block diagram of an entropy pre-processing system 200 with entropy pre-processor (EPP) 210 according to an embodiment of the disclosure. The EPP 210 may be implemented in hardware, software, firmware, or combinations thereof, and may include control logic, logic gates, processors, memory, and/or any combination or sub-combination of the same, and may pre-process one or more linearly encoded bitstreams in a memory-to-memory operation using one or more pre-processing techniques in order to determine data relating to slices comprising the one or more linearly encoded bitstreams. The EPP 210 may be used to implement the picture parallel decoder 110 of FIG. 1.

The EPP 210 may be configured to determine frame dependencies in the one or more linearly encoded bitstreams and to identify slice locations for parallelizing the one or more linearly encoded bitstreams for parallel decoding. Rather than decoding the one or more linearly encoded bitstreams, the EPP 210 may determine and store, at a memory, slice location data associated with the one or more linearly encoded bitstreams. The slice location data may identify, within a stream buffer, a location of a slice of VCL NAL data of a linearly encoded bitstream, as well as offset locations of the VPS RBSP data, the SPS RBSP data, the PPS RBSP data, or combinations thereof. For example, the EPP 210 may analyze the VCL NAL syntax headers in the one or more linearly encoded bitstreams to determine a slice location, and may store, at the memory, the slice location. Further, the EPP 210 may also determine and store the offset locations of the VPS RBSP data, the SPS RBSP data, the PPS RBSP data, or combinations thereof, associated with the slice location. The memory may be implemented using any memory, including but not limited to, dynamic random access memory (DRAM), static random access memory (SRAM), phase change memory (PCM), NAND flash memory, and NOR flash memory, or combinations thereof. The memory may comprise logical memory and/or may comprise a physical memory. For example, in at least one embodiment, the memory may comprise one or more physical memories divided into any number of logical memories.

In operation, the EPP 210 may receive one or more linearly encoded bitstreams from a stream buffer of a memory, and may determine slice location data from the one or more linearly encoded bitstreams. For example, the EPP 210 may identify a slice location within a stream buffer of a slice within a linearly encoded bitstream. The slice locations identified by the EPP 210 may be free of encoder-level dependencies on other slices within a linearly encoded bitstream. The EPP 210 may group slices with encoder-level dependencies between each other together that may be treated as a single slice during pre-processing. While the slice location data may identify groups of slices that are free of encoder-level dependencies on other slices, pixel-level dependencies between slices of a group of slices may remain.

The EPP 210 may also be configured to identify errors in NVCL data in the one or more linearly encoded bitstreams, such as missing or partially missing bits in NVCL units. The EPP pre-processing allows slices of the linearly encoded bitstream to be identified and allocated to be decoded in parallel. Additionally, pre-processing determination of errors in the NVCL data allows for proper decoding and ordering of decoded slices.

FIG. 2B is a block diagram of an entropy transcoder (EPX) system 250 according to an embodiment of the disclosure. The EPX system 250 may be implemented in hardware, software, firmware, or combinations thereof, and may include control logic, logic gates, processors, memory, and/or any combination or sub-combination of the same, and may transcode the linearly encoded bitstream into slices that may then be decoded in parallel by one or more decoders. The EPX system 250 may be used to implement the picture parallel decoder 110 of FIG. 1. In some embodiments, the EPX system 250 may be used in combination with the entropy pre-processing system 200 of FIG. 2A to implement the picture parallel decoder 110 of FIG. 1. Rather than decoding the one or more linearly encoded bitstreams. The EPX system 250 may include transcoders 260(0-N) configured to receive the linearly encoded bitstream and slice location data. The EPX system 250 may further include a slice buffer 270 configured to receive slice data from the transcoders 260(0-N).

The transcoders 260(0-N) may use the slice location data (e.g., from the EPP 210) to perform a memory-to-memory operation that stores slices of the one or more linearly encoded bitstreams in a slice buffer 270. The slice buffer 270 may be implemented using any memory, including but not limited to, dynamic random access memory (DRAM), static random access memory (SRAM), phase change memory (PCM), NAND flash memory, and NOR flash memory, or combinations thereof. The memory may comprise logical memory and/or may comprise a physical memory. For example, in at least one embodiment, the memory may comprise one or more physical memories divided into any number of logical memories.

In operation, the transcoders 260(0-N) may receive the linearly encoded bitstream and slice location data. Each transcoder 260(0-N) may receive a respective slice location within the VCL NAL data. In addition, each transcoder 260(0-N) may also receive the VPS RBSP, SPS RBSP, and PPS RBSP offset locations associated with the respective slice location. From the respective slice location data, each transcoder 260(0-N) may transcode a slice to a format that is ready for parallel decoding, and may provide the transcoded slice to the slice buffer 270. In some examples, the slice may be transcoded into a wavefront parallel processing (WPP) format. The transcoded slices may be received and stored at slice buffer 270. A parallel decoding system (not shown) may retrieve the transcoded slices from the slice buffer during decoding.

Figure 3:
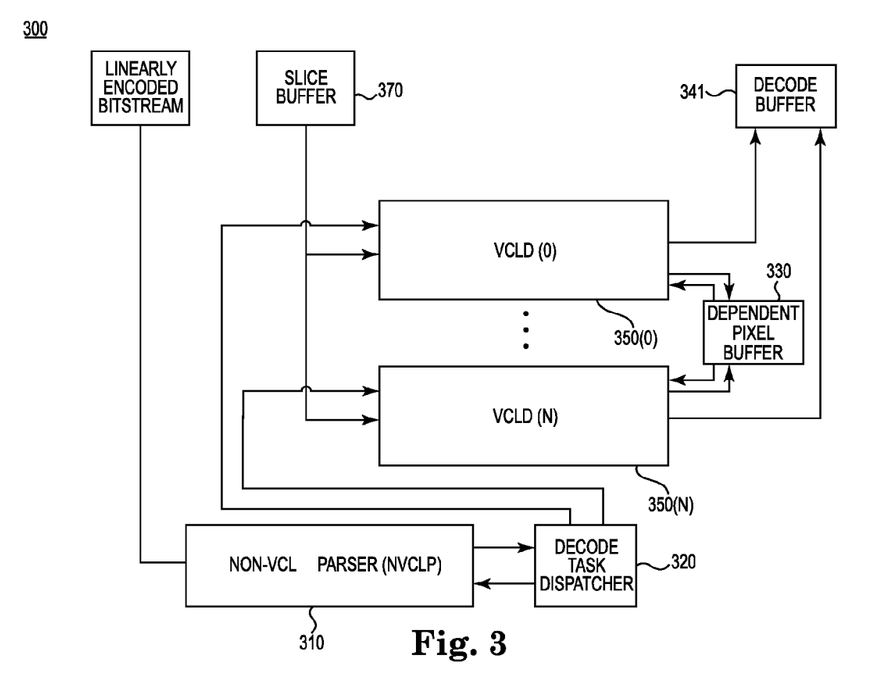
FIG. 3 is a block diagram of a parallelized decoding system including a decode task dispatcher according to an embodiment of the disclosure.

FIG. 3 is a block diagram of a parallelized decoding system 300 according to an embodiment of the invention. The parallelized decoding system 300 may be implemented in hardware, software, firmware, or combinations thereof, and may include control logic, logic gates, processors, memory, and/or any combination or sub-combination of the same, and may decode transcoded slices from a slice buffer 370. The slice buffer 370 may include the slice buffer 270 of FIG. 2B.

The parallelized decoding system 300 may include an NVCL parser (NVCLP) 310 configured to receive the one or more linearly encoded bitstreams and extract NVCL data from the one or more linearly encoded bitstreams. The parallelized decoding system 300 may include a decode task dispatcher 320 that receives the extracted NVCL data from the NVCLP 310.

The parallelized decoding system 300 may further include VCL decoders (VCLDs) 350(0-N) that are coupled to the decode task dispatcher 310 and to the slice buffer 370. The decode task dispatcher 310 may manage allocation of slices to be decoded to respective VCLDs 350(0-N). Each of the VCLDs 350(0-N) may be coupled to a dependent pixel buffer 330 that is configured to store information associated with pixels that have dependencies across different slices. The VCLDs 350(0-N) may provide the information to and retrieve information from dependent pixel buffer 330 for the pixels that have dependencies across the different slices during decoding of respective slices. The VCLDs 0 350(0-N) may provide the decoded slices to the decode buffer 341. The decode buffer 341 and/or the dependent pixel buffer 330 may be implemented using any memory, including but not limited to, dynamic random access memory (DRAM), static random access memory (SRAM), phase change memory (PCM), NAND flash memory, and NOR flash memory, or combinations thereof. The memory may comprise logical memory and/or may comprise a physical memory. For example, in at least one embodiment, the decode buffer 341 and/or the dependent pixel buffer 330 may comprise one or more physical memories divided into any number of logical memories.

In operation, the parallelized decoding system 300 may decode one or more linearly encoded bitstreams in parallel. The parallelized decoding system 300 may be configured to handle both VCL NAL and NVCL data. The NVCLP 310 may be configured to extract and parse the NVCL data directly from the one or more linearly encoded bitstreams. The NVCLP 310 may provide instructions to the decode task dispatcher 320. The decode task dispatcher 320 may manage allocation of the transcoded slices from the slice buffer 370 to respective VCL decoders (VCLDs) 350(0-N). A respective VCLD 350(0-N) may provide an indication of completion of decode of a slice to the decode task dispatcher 320. Responsive to receiving the indication from the respective VCLD 350(0-N), the decode task dispatcher 320 may allocate the respective VCLD 350(0-N) another transcoded slice to decode from slice buffer 270. In this way, at any given time, each of the VCLD 350(0-N) may decode the transcoded slices in parallel, that may improve efficiency in decoding a linearly encoded bitstream. Because the transcoded slices may vary in size and complexity, they may require more or less time to decode. As such, a later-allocated transcoded slice may take less time than an earlier-allocated transcoded slice. In such a situation, because decode task manager 320 constantly allocates decoding tasks to a respective VCLD 50(0-N) based on receiving an indication of completion of decode of a previously allocated slice, the transcoded slices may be decoded out of order. The results of completed decoding tasks are stored as decoded slices in decode buffer 341.

While the transcoded slices stored in the slice buffer 370 may be independent with respect to encoder-level dependencies, the transcoded slices may still have pixel-level dependencies between the transcoded slices. Pixel-level dependencies may include spatial or temporal dependencies between pixels across coding units or transcoded slices. These pixel-level dependencies may be managed by the dependent pixel buffer 330. The dependent pixel buffer 330 may be accessed by the VCLDs 350(0-N) while decoding transcoded slices that have pixel-level dependencies. After any pixel-level dependencies are resolved for a given transcoded slice decoding task, the respective VCLD 350 (0-N) may provide the completed decoded slice to the decode buffer 341.

Figure 4:
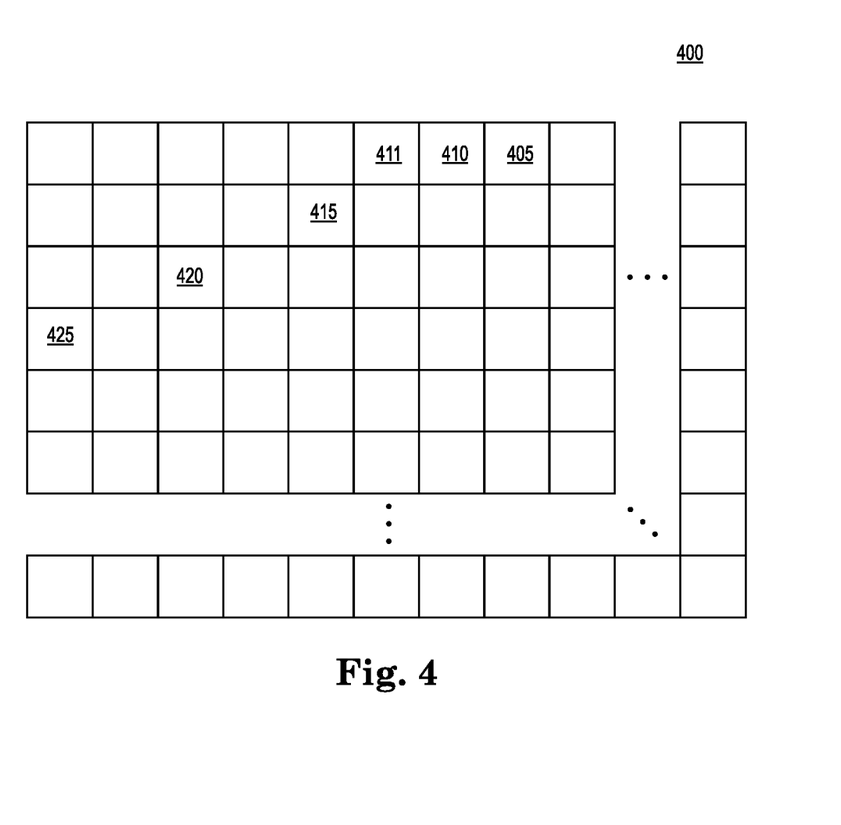
FIG. 4 is a schematic diagram of a frame according to an embodiment of the disclosure.

FIG. 4 is a schematic diagram of a frame according to an embodiment of the present invention. FIG. 4 depicts a frame composed of coding units that may be MBs (in the case of H.264 encoding) or CTUs (in the case of HEVC encoding). As illustrated in FIG. 4, a frame to be decoded may have been encoded using a "wavefront" encoding scheme that utilized a spatial offset arrangement. By way of example, with reference to FIG. 4, a portion of frame 400 including coding units 410, 415, 420, and 425 may be decoded in parallel by VCLDs, such as the VCLDs 350(0-N) of FIG. 3. At any given time during a decoding operation, coding units 410, 415, 420, and 425 may each be decoded by a respective VCLD. As illustrated, a spatial offset (e.g. 1 row, two columns) may be used to offset (e.g. stagger) the point at which each VCLD is decoding a respective coding unit at a given time relative to other VCLDs. In some instances, decoding of the pixels in the coding units, such as coding unit 410, may depend on pixels in one or more coding units, such as coding unit 411. As a result of the spatial offset, the coding unit 411 may be decoded before the coding unit 410 is decoded.

Problems may arise when decoding the first coding unit of a row of coding units. In order to maintain pixel dependencies between coding unit rows, each coding unit row may be started after a top right coding unit of a previous row is decoded. In this situation, a dependent pixel buffer, such as the dependent pixel buffer 341 of FIG. 3, may store decoded pixel dependency data to be accessed by the VCLD decoding the current transcoded slice or to be accessed by another VCLD decoding a different transcoded slice. A VCLD decoding a transcoded slice containing pixel-level dependencies will check the dependent pixel buffer for decoded pixel dependency data in order to complete the decoding of the slice.

Figure 5:
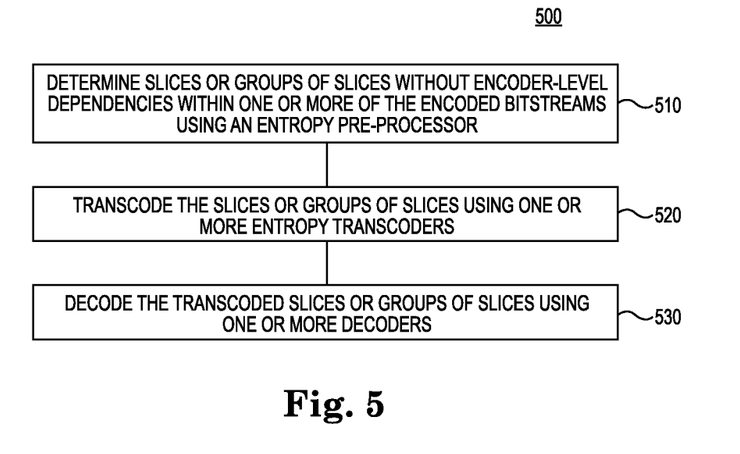
FIG. 5 is a flowchart for a method for decoding an encoded bitstream according to an embodiment of the disclosure.

FIG. 5 is a flowchart 500 for a method for implementing picture parallel decoding of one or more linearly encoded bitstreams according to an embodiment of the disclosure. The method illustrated by the flowchart 500 may be implemented by the picture parallel decoder 110 of FIG. 1, the EPP system 210 of FIG. 2A, the EPX system 250 of FIG. 2B, and/or the parallelized decoding system with decode task dispatching 300 of FIG. 3.

The method 500 may include identifying slices of one or more encoded bitstreams that are free from encoder-level dependencies using an entropy pre-processor, at 510. These slices may be identified by slice locations and include slice offset locations of VCL NAL data of the one or more encoded bitstreams. Slices with encoder-level dependencies on a particular slice may be grouped together as a segment.

The segment may be treated as a single slice. The slices may be identified by the EPP system 210 of FIG. 2A.

The method 500 may further include transcoding the identified slices of the one or more encoded bitstreams, at 520. Transcoding the identified slices may be performed by one or more entropy transcoders. For example, transcoding slices may be a memory-to-memory operation performed by the EPX system 250 of FIG. 2B.

The method 500 may further include decoding the transcoded slices, at 530. Decoding the transcoded slices may be performed by one or more decoders. The one or more decoders may include the VCLDs 350(0-N) of FIG. 3. Decoding the transcoded slices may include decoding the transcoded slices in an order that is different than the order in which the transcoded slices were encoded in the one or more encoded bitstreams. Further, decoding the transcoded slices may include decoding two or more of the transcoded slices in parallel (e.g., two or more of the transcoded slices are decoded at the same time).

Components described herein, including but not limited to the EPP, EPX, and picture parallel decoding systems described herein, may be implemented in all or in part using software in some examples. The software may be implemented using instructions encoded on one or more computer readable media. Any electronic storage (e.g. memory) may be used to implement the computer readable media, which may be transitory or non-transitory. The computer readable media may be encoded with instructions for performing the acts described herein, including but not limited to, parsing, transcoding, or decoding. The instructions may be executable by one or more processing units to perform the acts described. The processing units may be implemented using any number and type of hardware capable of executing the instructions including, but not limited to, one or more processors, circuitry, or combinations thereof.

The method 500 may be implemented by a field-programmable gate array (FPGA) device, an application-specific integrated circuit (ASIC), a processing unit such as a central processing unit (CPU), a digital signal processor (DSP), a controller, another hardware device, a firmware device, or any combination thereof. As an example, the method 500 may be implemented by a computing system using, for example, one or more processing units that may execute instructions for performing the method that may be encoded on a computer readable medium. The processing units may be implemented using, e.g. processors or other circuitry capable of processing (e.g. one or more controllers or other circuitry). The computer readable medium may be transitory or non-transitory and may be implemented, for example, using any suitable electronic memory, including but not limited to, system memory, flash memory, solid state drives, hard disk drives, etc. One or more processing units and computer readable mediums encoding executable instructions may be used to implement all or portions of encoders or encoding systems described herein.

Figure 6:
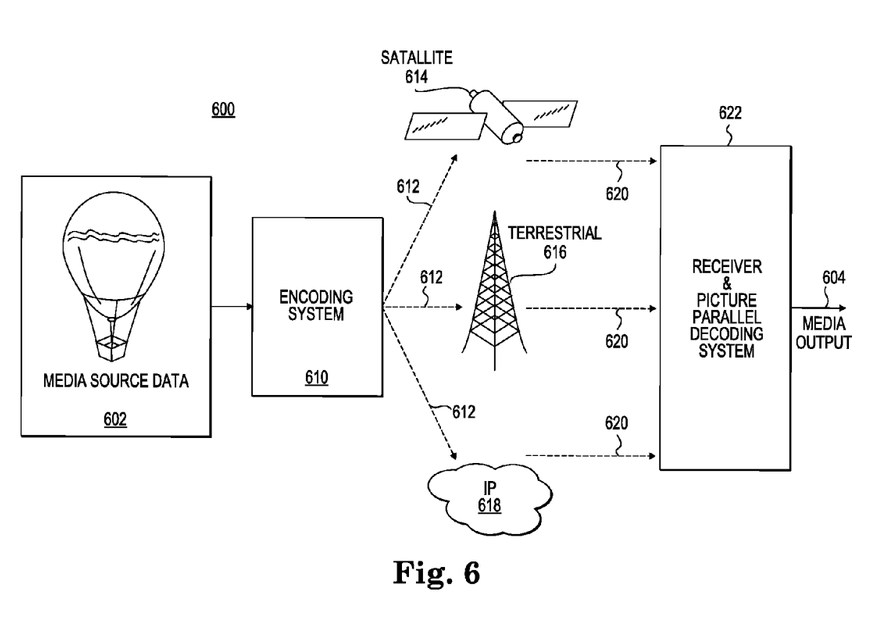
FIG. 6 is a schematic illustration of a media delivery system according to an embodiment of the disclosure.

FIG. 6 is a schematic illustration of a media delivery system 600 in accordance with embodiments. The media delivery system 600 may provide a mechanism for delivering a media source 602 to one or more of a variety of media output(s) 604. Although only one media source 602 and media output 604 are illustrated in FIG. 6, it is to be understood that any number may be used, and examples may be used to broadcast and/or otherwise deliver media content to any number of media outputs.

The media source data 602 may be any source of media content, including but not limited to, video, audio, data, or combinations thereof. The media source data 602 may be, for example, audio and/or video data that may be captured using a camera, microphone, and/or other capturing devices, or may be generated or provided by a processing device. Media source data 602 may be analog or digital. When the media source data 602 is analog data, the media source data 602 may be converted to digital data using, for example, an analog-to-digital converter (ADC). The media source data 602 may represent several channels of media source data. Typically, to transmit each channel of the media source data 602, some type of compression and/or encryption may be desirable, with the compressed/encrypted channels being distributed over a common link. Accordingly, an encoding system 610 may be provided that may encode each channel of the media source data 602 using any encoding method in the art, known now or in the future, including encoding methods in accordance with video standards such as, but not limited to, MPEG-2, MPEG-4, H.264, HEVC, or combinations of these or other encoding standards.

Encoding system 610 may combine encoded data of each channel, or selected channels, of the media source data 602 based on a bandwidth of a communication link and to provide the combined encoded data 612 over a communications link. In other examples, channels may be received from multiple source data instances. Examples of communications links may include a satellite 614, an antenna 616, and/or a network 618. The receiver and picture parallel decoding system 622 may be implemented using any picture parallel decoding components described herein, including the picture parallel decoder 110 of FIG. 1, the EPP 210 of FIG. 2A, the EPX system 250 of FIG. 2B, the parallelized decoding system with decode task dispatching 300 of FIG. 3, and may be configured to implement the method 500 of FIG. 5, or combinations thereof. The network 618 may be wired or wireless, and further may communicate using electrical and/or optical transmission. The antenna 616 may be a terrestrial antenna, and may, for example, receive and transmit conventional AM and FM signals, satellite signals, or other signals known in the art. The communications communication link may broadcast the combined encoded data 612, and in some examples may alter the combined encoded data 612 and broadcast the altered combined encoded data 612 (e.g., by re-encoding, adding to, or subtracting from the combined encoded data 602). The combined encoded data 620 provided from the communications communication link may be received by a receiver 622 that may include or be coupled to a picture parallel decoding system. The picture parallel decoding system may decode the combined encoded data 620 to provide one or more media outputs, with the media output 604 shown in FIG. 6.

The receiver and picture parallel decoding system 622 may be included in or in communication with any number of devices, including but not limited to a modem, router, server, set-top box, laptop, desktop, computer, tablet, mobile phone, etc.

The media delivery system 600 of FIG. 6 and/or the encoding system 610 and/or the receiver and picture parallel decoding system 622 may be utilized in a variety of segments of a content distribution industry.

Figure 7:
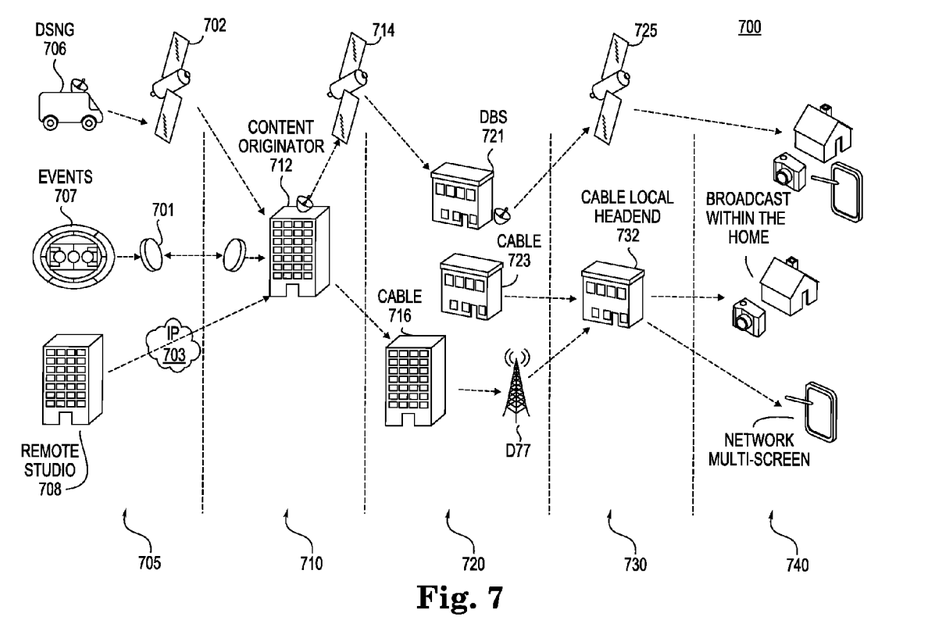
FIG. 7 is a schematic illustration of a video distribution system that may make use of a media delivery system described herein.

FIG. 7 is a schematic illustration of a video distribution system that 700 may make use of encoders described herein. The video distribution system 700 includes video contributors 705. The video contributors 705 may include, but are not limited to, digital satellite news gathering systems 706, event broadcasts 707, and remote studios 708. Each or any of these video contributors 705 may utilize an encoding system, such as encoding system 610 of FIG. 6 to encode and combine multiple channels of media source data and provide combined channel encoded data to a communications link. The digital satellite news gathering system 706 may provide combined channel encoded data to a satellite 702. The event broadcast 707 may provide combined channel encoded data to an antenna 701. The remote studio 708 may provide combined channel encoded data over a network 703.

A production segment 710 may include a content originator 712. The content originator 712 may receive combined channel encoded data from any or combinations of the video contributors 705. The content originator 712 may make the received content available, and may edit, combine, and/or manipulate any of the received content to make the content available. The content originator 712 may utilize encoding systems such as encoding system 610 of FIG. 6, to provide combined channel encoded data to the satellite 714 (or another communications link). The content originator 712 may provide combined channel encoded data to a digital terrestrial television system 716 over a network or other communication link. In some examples, the content originator 712 may utilize a decoder to decode the content received from the contributor(s) 705. The content originator 712 may then re-encode and combine data, and provide the combined channel encoded data to the satellite 714. In other examples, the content originator 712 may not decode the received data, and may utilize a transcoder, such the EPX system 250 of FIG. 2B to change an encoding format of the received data.

A primary distribution segment 720 may include a digital broadcast system 721, the digital terrestrial television system 716, and/or a cable system 723. The digital broadcasting system 721 may include a receiver, such as the receiver and picture parallel decoding system 622 described with reference to FIG. 6, to receive combined channel encoded data from the satellite 714. The digital terrestrial television system 716 may include a receiver, such as the receiver and picture parallel decoding system 622 described with reference to FIG. 6, to receive combined channel encoded data from the content originator 712. The cable system 723 may host its own content that may or may not have been received from the production segment 710 and/or the contributor segment 705. For example, the cable system 723 may provide its own media source data 602 as that which was described with reference to FIG. 6.

The digital broadcast system 721 may include an encoder, such as the encoding system 610 of FIG. 6, to provide encoded data to the satellite 725. The cable system 723 may also include an encoder, such as encoding system 610 of FIG. 6, to provide combined channel encoded data over a network or other communications communication link to a cable local headend 732. A secondary distribution segment 730 may include, for example, the satellite 725 and/or the cable local headend 732.

The cable local headend 732 may include an encoding system, such as the encoding system 610 of FIG. 6, to provide combined channel encoded data to clients in a client segment 740 over a network or other communications link. The satellite 725 may broadcast signals to clients in the client segment 740. The client segment 740 may include any number of devices that may include receivers, such as the receiver and picture parallel decoding system 622 and associated picture parallel decoding system described with reference to FIG. 6, for decoding content in parallel, and ultimately, making content available to users. The client segment 740 may include devices such as set-top boxes, tablets, computers, servers, laptops, desktops, cell phones, etc.

Accordingly, encoding, transcoding, and/or decoding may be utilized at any of a number of points in a video distribution system. Embodiments may find use within any, or in some examples all, of these segments.

From the foregoing it will be appreciated that, although specific embodiments of the disclosure have been described herein for purposes of illustration, various modifications may be made without deviating from the spirit and scope of the disclosure. Accordingly, the disclosure is not limited except as by the appended claims.

What is claimed is:

1. An apparatus, comprising:
an entropy pre-processing unit configured to (i) receive a bitstream, wherein the bitstream is linearly encoded, (ii) determine dependencies between a plurality of frames of the bitstream, to (iii) determine slice location data within the bitstream based on the dependencies between the frames, (iv) identify, based on the slice location data and the dependencies between the frames, a plurality of groups of slices in the bitstream, wherein (a) at least one of the groups comprises one of the slices that was encoded independent of all other slices and (b) at least another one of the groups comprises a plurality of the slices that were encoded with a dependency upon each other;
a plurality of transcoding units configured to (i) each receive the bitstream and the slice location data and (ii) separate the identified groups from the bitstream; and
a plurality of decoders configured to decode in parallel two or more of the slices within the groups separated from the bitstream, wherein (i) a first decoder is configured to decode a first group and (ii) a second decoder is configured to decode, in parallel with the first decoder, a second group.

2. The apparatus of claim 1, wherein the entropy pre-processing unit is further configured to determine the slice location data for the slices that are free of encoder-level dependencies.

3. The apparatus of claim 1, wherein the entropy pre-processing unit is further configured to analyze video coding layer network abstraction layer (VCL NAL) syntax headers to determine the slice location data.

4. The apparatus of claim 3, wherein the entropy pre-processing unit is further configured to determine video parameter set (VPS) raw byte sequence payload (RBSP) offset locations, sequence parameter set (SPS) RBSP offset locations, and/or picture parameter set (PPS) RBSP offset locations.

5. The apparatus of claim 3, wherein the entropy pre-processing unit is configured to ignore non-VCL data.

6. The apparatus of claim 1, further comprising a decode dispatch task manager configured to allocate individual ones of the slices to respective ones of the plurality of decoders.

7. The apparatus of claim 6, wherein the decode dispatch task manager ensures that, at any given time, each of the plurality of decoders is engaged in decoding a respective one of the slices.

8. The apparatus of claim 6, further comprising a non-VCL (NVCL) parser configured to (i) parse NVCL data from the bitstream and (ii) provide instructions to the decode dispatch task manager based on the parsed NVCL data.

9. The apparatus of claim 6, wherein the decode dispatch task manager is configured to allocate the individual ones of the slices to the respective ones of the plurality of decoders in an order that is different than an order in which the slices were separated from the bitstream.

10. The apparatus of claim 1, further comprising a dependent pixel buffer configured to store dependent pixel information received from the plurality of decoders during decode of the slices.

11. The apparatus of claim 1, wherein the bitstream comprises an H.264 encoded bitstream or an HEVC encoded bitstream.

12. A non-transitory computer-readable medium comprising instructions that, when executed by one or more processing units, cause the one or more processing units to:
determine dependencies between a plurality of frames of a bitstream, wherein the bitstream is linearly encoded;
determine slice location data within the bitstream based on the dependencies between the frames;
identify, based on the slice location data and the dependencies between the frames, a plurality of groups of slices in the bitstream, wherein (a) at least one of the groups comprises one of the slices that was encoded independent of all other slices and (b) at least another one of the groups comprises a plurality of the slices that were encoded with a dependency upon each other;
separate the identified groups from the bitstream; and
decode in parallel two or more of the slices within the groups separated from the bitstream, wherein (i) a first decode is configured to decode a first group and (ii) a second decode is configured to decode, in parallel with the first decode, a second group.

13. The non-transitory computer readable medium of claim 12, wherein the instructions further comprise instructions that, when executed by one or more processing units, cause the one or more processing units to:
decode the groups of two or more slices in an order different from the order in which the slices were encoded in the bitstream.

14. The non-transitory computer-readable medium of claim 12, wherein the instructions further comprise instructions that, when executed by the one or more processing units, cause the one or more processing units to:
decode two or more of the groups comprising the plurality of slices at a same time.

15. The non-transitory computer-readable medium of claim 12, wherein the instructions further comprise instructions that, when executed by the one or more processing units, cause the one or more processing units to:
store pixel-level dependency data corresponding to pixel dependencies in the groups of comprising the plurality of slices using a dependent pixel buffer.

16. The non-transitory computer-readable medium of claim 15, wherein the instructions further comprise instructions that, when executed by the one or more processing units, cause the one or more processing units to:
access decoded pixel-level dependency data stored at the dependent pixel buffer during the decode.

17. The non-transitory computer-readable medium of claim 12, wherein the bitstream comprises an H.264 encoded bitstream or an HEVC encoded bitstream.

18. A method for parallel decoding, comprising the steps of:
determining dependencies between a plurality of frames of a bitstream, wherein the bitstream is linearly encoded;
determining slice location data within the bitstream based on the dependencies between the frames;
identifying, based on the slice location data and the dependencies between the frames, a plurality of groups of slices in the bitstream, wherein (a) at least one of the groups comprises one of the slices that was encoded independent of all other slices and (b) at least another one of the groups comprises a plurality of the slices that were encoded with a dependency upon each other;
separating the identified groups from the bitstream; and
decoding in parallel two or more of the slices within the groups separated from the bitstream, wherein (i) a first decoding is configured to decode a first group and (ii) a second decoding is configured to decode, in parallel with the first decoding, a second group.

19. The method of claim 18 wherein the decoding of the slices uses one or more decoders in an order different from the order in which the slices were encoded in the bitstream.

20. The method of claim 19, wherein the groups separated from the bitstream are buffered before the decoding of the slices.

* * * * *